US008883103B1

(12) United States Patent
Szczepanski et al.

(10) Patent No.: US 8,883,103 B1
(45) Date of Patent: Nov. 11, 2014

(54) CATALYTIC CONVERTER FOR TREATING IONIZED EXHAUST

(71) Applicants: DENSO International America, Inc., Southfield, MI (US); Denso Corporation, Kariya (JP)

(72) Inventors: Edward Szczepanski, Grosse Pointe Woods, MI (US); Nicholas Polcyn, Commerce, MI (US)

(73) Assignees: DENSO International America, Inc., Southfield, MI (US); Denso Corporation, Kariya-shi, Aichi-ken (JP)

( * ) Notice: Subject to any disclaimer, the term of this patent is extended or adjusted under 35 U.S.C. 154(b) by 0 days.

(21) Appl. No.: 14/157,152

(22) Filed: Jan. 16, 2014

(51) Int. Cl.
| | |
|---|---|
| *B01D 53/74* | (2006.01) |
| *B01D 53/86* | (2006.01) |
| *B01D 53/94* | (2006.01) |
| *F01N 3/10* | (2006.01) |
| *F01N 3/20* | (2006.01) |

(52) U.S. Cl.
CPC ............... *F01N 3/208* (2013.01); *Y10S 423/10* (2013.01)
USPC .................. 423/213.2; 423/213.5; 423/213.7; 423/215.5; 423/239.1; 423/DIG. 10; 60/274; 60/275; 60/299; 60/301

(58) Field of Classification Search
USPC .......... 423/213.2, 213.5, 213.7, 239.1, 215.5, 423/DIG. 10; 60/274, 275, 299, 301
See application file for complete search history.

(56) References Cited

U.S. PATENT DOCUMENTS

| | | | | |
|---|---|---|---|---|
| 3,768,258 | A * | 10/1973 | Smith et al. ..................... | 60/275 |
| 7,517,215 | B1 | 4/2009 | Chehroudi et al. | |
| 7,665,985 | B1 | 2/2010 | Chehroudi et al. | |
| 2005/0217241 | A1 * | 10/2005 | Nakanishi et al. .............. | 60/275 |
| 2009/0211231 | A1 * | 8/2009 | Yoshida et al. ................. | 60/275 |
| 2011/0214413 | A1 * | 9/2011 | Hodgson et al. ................ | 60/274 |

\* cited by examiner

*Primary Examiner* — Timothy Vanoy
(74) *Attorney, Agent, or Firm* — Harness, Dickey & Pierce, P.L.C.

(57) ABSTRACT

A method for treating exhaust from an engine. The method includes activating an exhaust ionizer in receipt of the exhaust when temperature of a catalyst of a selective catalytic converter, which is in communication with the exhaust ionizer so as to receive exhaust from the exhaust ionizer, is equal to or above an effective temperature. The method further includes deactivating or maintaining the exhaust ionizer in a deactivated state when temperature of the catalyst is below the effective temperature.

20 Claims, 3 Drawing Sheets

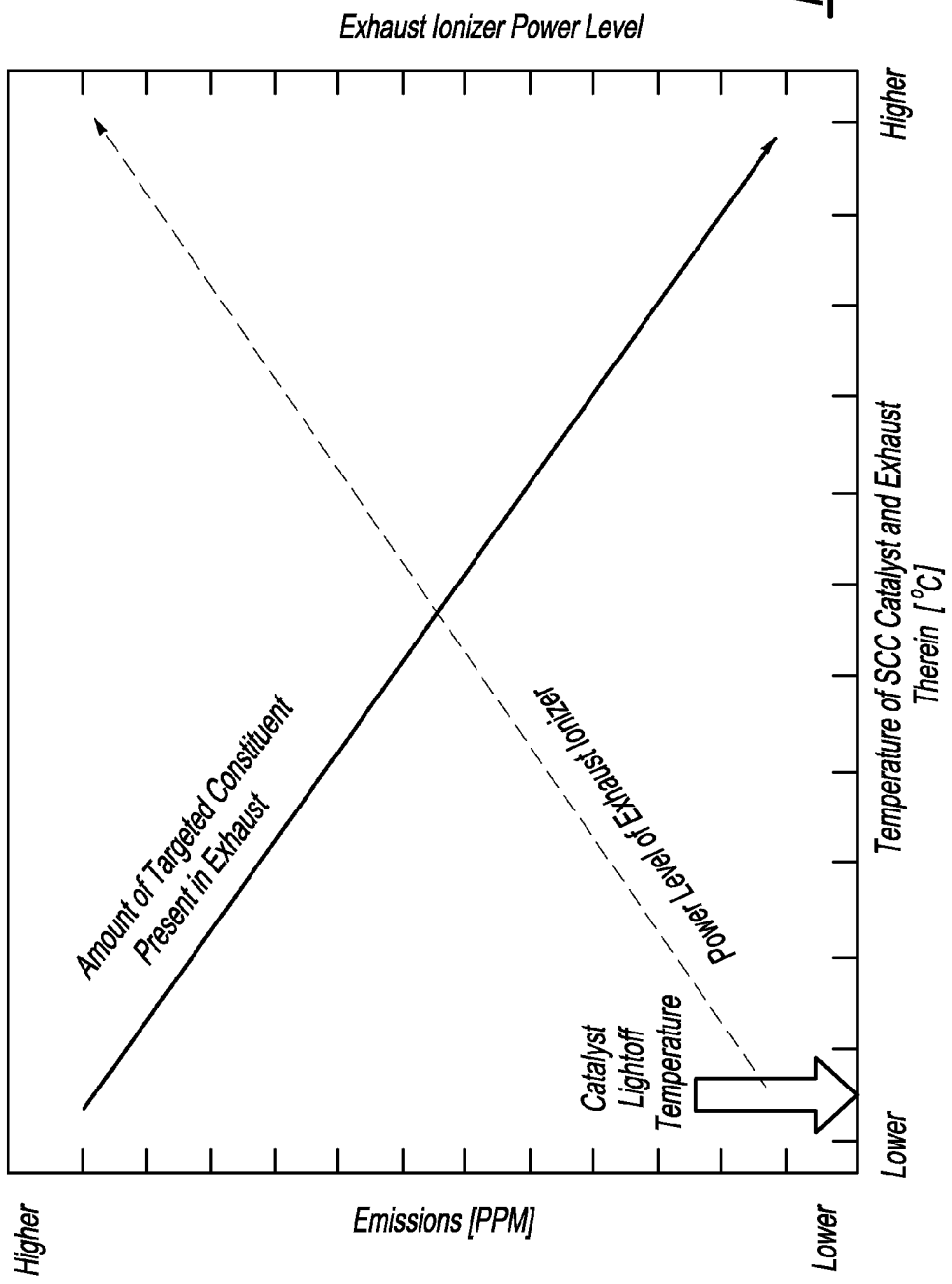

CATALYTIC CONVERTER FOR TREATING IONIZED EXHAUST

FIELD

The present disclosure relates to a catalytic converter for treating ionized exhaust gas.

BACKGROUND

This section provides background information related to the present disclosure, which is not necessarily prior art.

Exhaust gas can be ionized with a suitable exhaust ionizer, such as a corona discharge device or plasma reactor, to facilitate collection of particulate matter, such as with a charged particle collection device charged opposite to exhaust charged by the ionizer. Exhaust ionizers facilitate collection of particulate matter, but can undesirably increase the presence of undesirable constituents in the exhaust, such as $NO_x$. Regulations governing vehicle emissions are primarily concerned with the following: unburned hydrocarbons (HC), carbon monoxide (CO), nitrogen oxides ($NO_x$), and particulates. Particulate matter is a component of engine exhaust, such as gasoline or diesel exhaust, for example, that includes soot particles, which are primarily unburned hydrocarbons.

To reduce the undesirable constituents to an environmentally safe form, exhaust systems can include a selective catalytic converter. For example, a selective catalytic converter including an ammonia catalyst can reduce $NO_x$ to $N_2$ and water. However, if the temperature of the catalyst is below its lightoff temperature, the selective catalytic converter will be ineffective to treat or reduce the constituent(s) it is designed to target. An improved method or system for reducing undesirable constituents and restricting their release into the environment would therefore be desirable.

SUMMARY

This section provides a general summary of the disclosure, and is not a comprehensive disclosure of its full scope or all of its features.

The present teachings provide for a method for treating exhaust from an engine. The method includes activating an exhaust ionizer in receipt of the exhaust when temperature of a catalyst of a selective catalytic converter, which is in communication with the exhaust ionizer so as to receive exhaust from the exhaust ionizer, is equal to or above an effective temperature. The method further includes deactivating or maintaining the exhaust ionizer in a deactivated state when temperature of the catalyst is below the effective temperature.

The present teachings also provide for a system for treating exhaust from an engine including an exhaust ionizer configured to ionize exhaust and a selective catalytic converter configured to oxidize a target emissions constituent. The system further includes a controller configured to: receive temperature data representing temperature of a catalyst of the selective catalytic converter; activate the exhaust ionizer when temperature of the catalyst is equal to or above an effective temperature; and deactivate or maintain the exhaust ionizer in a deactivated state when temperature of the catalyst is below the effective temperature.

The present teachings further provide for a system for treating exhaust from an engine including an exhaust ionizer configured to ionize exhaust, a selective catalytic converter configured to oxidize a target emissions constituent, a primary catalytic converter, a particulate matter filter, a particle collection device, at least one temperature sensor, and a controller. The primary catalytic converter is configured to at least oxidize carbon monoxide and is between the exhaust ionizer and the selective catalytic converter. The particulate matter filter is configured to filter particulate matter from the exhaust, and is between the primary catalytic converter and the selective catalytic converter. The particle collection device is between the exhaust ionizer and the primary catalytic converter, and is charged opposite to a charge applied to exhaust by the exhaust ionizer. The at least one temperature sensor is configured to measure temperature of a catalyst within the selective catalytic converter. The controller is in receipt of temperature measurements from the at least one temperature sensor. The controller is configured to activate the exhaust ionizer when temperature of the catalyst is equal to or above an effective temperature, and deactivate or maintain the exhaust ionizer in a deactivated state when temperature of the catalyst is below the effective temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates relationships between power level of an exhaust ionizer according to the present teachings, temperature of exhaust and a catalyst within a catalytic converter according to the present teachings, and exhaust emissions.

Corresponding reference numerals indicate corresponding parts throughout the several views of the drawings.

DETAILED DESCRIPTION

Example embodiments will now be described more fully with reference to the accompanying drawings.

Figure 1:
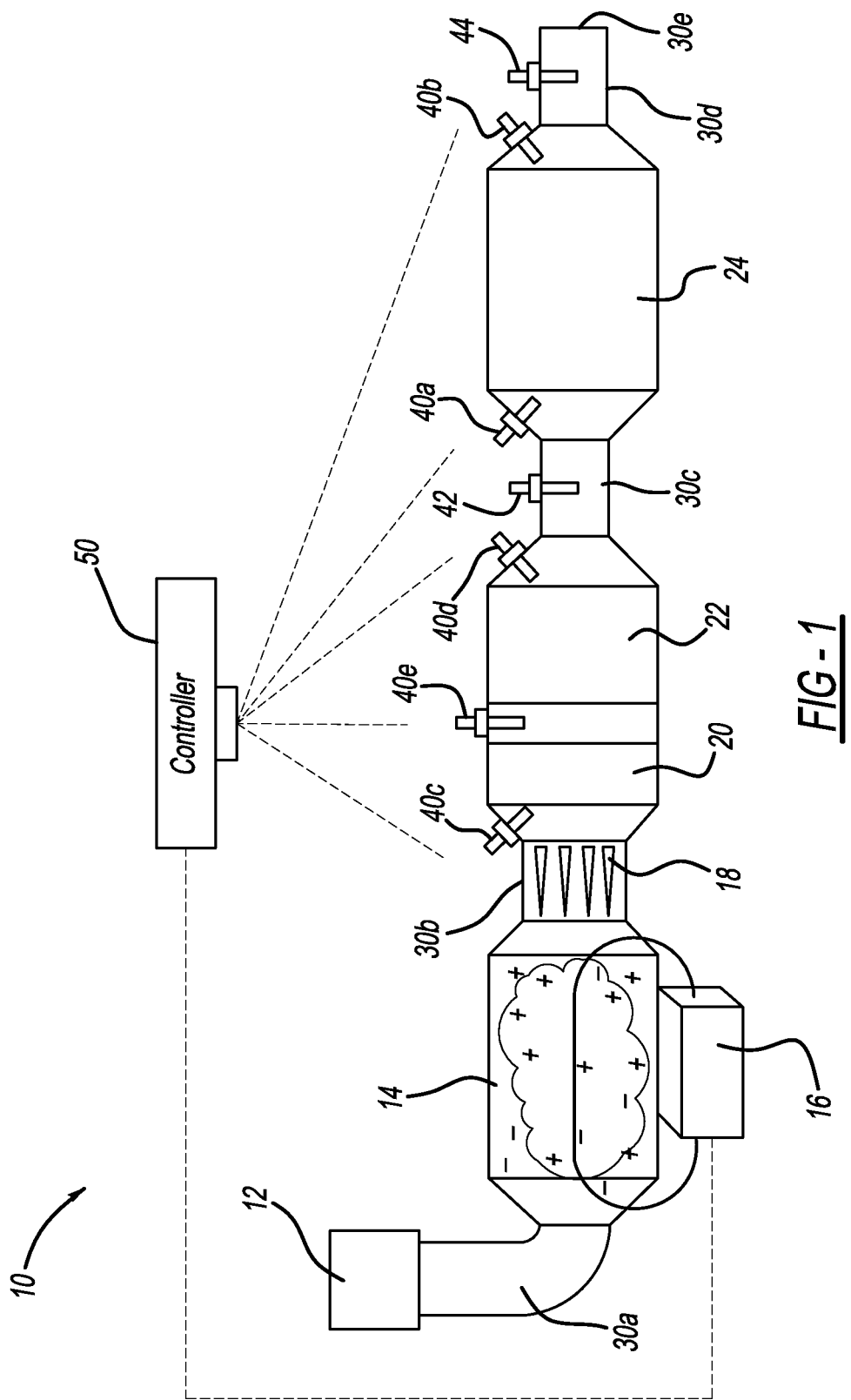
FIG. 1 is a schematic of an exhaust system according to the present teachings.

With initial reference to FIG. 1, an exemplary exhaust system according to the present teachings is generally illustrated at reference numeral 10. Although the exhaust system 10 is described herein as configured for treating exhaust generated by a motor vehicle engine, such as a diesel engine, the exhaust system 10 can be used with, or modified for use with, any suitable engine in order to filter particulate matter present in exhaust from the engine and/or reduce or eliminate various byproducts present in exhaust emitted by the engine, such as carbon monoxide, nitrogen oxides ($NO_x$), and unburned hydrocarbons. In addition to treating exhaust generated by a vehicle engine, the exhaust system 10 can be configured to treat exhaust emitted by, for example, a generator, an HVAC system, an aircraft engine, a military vehicle engine, a construction vehicle, a utility vehicle engine, a heavy-duty vehicle engine, or any other engine or device that emits exhaust.

The exhaust system 10 generally includes an exhaust source 12, such as an engine, an exhaust ionizing chamber 14 with an exhaust ionizer 16 associated therewith, a particle collection device 18, a primary catalytic converter 20, a particulate filter 22, and a selective catalytic converter 24. Each of the afore-mentioned elements of the exhaust system 10 are connected by various exhaust conduit portions 30a-30d, as further described herein, which direct exhaust from the exhaust source 12 to an exhaust outlet or tailpipe 30e. Each of the afore-mentioned components of the exhaust system 10 will now be described in detail.

The ionizing chamber 14 is coupled to the exhaust source 12 by first exhaust conduit portion 30a. Associated with the ionizing chamber 14 is the exhaust ionizer 16, which may be any suitable device or system configured to ionize exhaust passing through the ionizing chamber 14. For example, the exhaust ionizer 16 can be a corona discharge device or a plasma reactor. The exhaust ionizer 16 alters the composition of exhaust passing through the ionizing chamber 14 by promoting reactions, such as the oxidation of nitric oxide (NO) to nitrogen oxides ($NO_x$) (such as nitrogen dioxide ($NO_2$)), the formation of oxidized hydrocarbons from unburned hydrocarbon residues, and oxidation reactions causing the activation of particulates. Exhaust thus enters the ionizing chamber 14 with a neutral charge, and exits the ionizing chamber 14 with either a positive or a negative charge applied by the exhaust ionizer 16 depending on how the exhaust ionizer 16 is configured.

Exhaust conduit 30b connects the ionizing chamber 14 to the primary catalytic converter 20. The particle collection device 18 is located within the exhaust conduit 30b. The particle collection device 18 is any suitable device, such as a filter, that is charged opposite to the charge applied to the exhaust by the exhaust ionizer 16 in the ionizing chamber 14. The particle collection device 18 thus filters oppositely charged exhaust particulates, such as unburned hydrocarbons or soot.

Downstream from the particle collection device 18 is the primary catalytic converter 20. The primary catalytic converter 20 can be any suitable vehicle emissions control device configured to convert undesirable engine byproducts present in the exhaust to an environmentally friendly output. For example, the primary catalytic converter 20 can be a three-way catalytic converter configured to convert carbon monoxide (CO) and unburned hydrocarbons (HC) to produce carbon dioxide ($CO_2$) and water ($H_2O$), and to reduce oxides of nitrogen ($NO_x$) to nitrogen gas ($N_2$).

Downstream from the primary catalytic converter 20 from the exhaust source 12 is the particulate filter 22. The particulate filter 22 can be any filter or device generally configured to remove particulates from the exhaust gas, such as unburned hydrocarbons or soot. Examples of suitable filters include cordierite wall flow filters, silicon carbide wall flow filters, ceramic fiber filters, or metal fiber flow through filters.

The selective catalytic converter 24 is connected to the particulate filter 22 by exhaust conduit 30c, such that the selective catalytic converter 24 is downstream from the particulate filter 22. The selective catalytic converter 24 can be any suitable device or system configured to convert nitrogen oxides ($NO_x$) that may still be present in the exhaust into diatomic nitrogen ($N_2$) and water ($H_2O$) with the aid of a catalyst. A gaseous reductant, such as anhydrous ammonia ($NH_3$), aqueous ammonia, or urea, can be added to the exhaust and can be absorbed onto the catalyst. Any suitable catalyst can be used, such as a catalyst including a ceramic carrier, such as titanium oxide, and an active catalytic component, such as either oxides of base metals (such as vanadium, molybdenum or tungsten), zeolites, or various precious metals, such as platinum. For the selective catalytic converter 24 to be effective to separate $NO_x$ into environmentally safe nitrogen ($N_2$) and water, the catalyst should typically be heated above its lightoff temperature, such as by the exhaust passing through the selective catalytic converter 24. As described herein, the present teachings monitor the temperature of exhaust present in the selective catalytic converter 24 and optimize operation of the exhaust ionizer 16 so as to not operate the exhaust ionizer 16, which generates $NO_x$, until the catalyst of the selective catalytic converter 24 is heated above its lightoff temperature by the exhaust.

The exhaust system 10 further includes a plurality of temperature sensors 40a-40e. The temperature sensors can each be any suitable type of sensing device configured to measure temperature of exhaust at various different positions within the exhaust system 10. For example, first temperature sensor 40a can be positioned at an inlet of the selective catalytic converter 24 and second temperature sensor 40b can be positioned at an outlet of the selective catalytic converter 24 in order to measure temperature of exhaust at the inlet and the outlet of the selective catalytic converter 24. The temperature sensor 40b thereby permits identification of exhaust temperature within the selective catalytic converter 24, and indirectly temperature of the catalyst of the selective catalytic converter 24. In addition to, or in place of, the first and second temperature sensors 40a and 40b of the inlet and outlet of the selective catalytic converter 24 respectively, a single temperature sensor could be provided within the selective catalytic converter 24.

The temperature sensor 40c is arranged at an inlet of the primary catalytic converter 20, and is between the particle collection device 18 and the primary catalytic converter 20. The third temperature sensor 40c measures temperature at an inlet of the primary catalytic converter 20. The fourth temperature sensor 40d is at an outlet of the particulate filter 22, and thus measures temperature of exhaust exiting the particulate filter 22. The fifth temperature sensor 40e can be provided between the primary catalytic converter 20 and the particulate filter 22 in order to measure temperature of exhaust flowing from the primary catalytic converter 20 to the particulate filter 22. The arrangement of the temperature sensors 40a-40e illustrated in FIG. 1 and described above is merely an exemplary arrangement. The temperature sensors 40a-40e can be provided at any suitable position within the exhaust system 10 appropriate for measuring temperature of exhaust at any desired location within the exhaust system 10.

The exhaust system 10 can further include any other suitable sensors or monitoring devices for monitoring operation of the exhaust system 10 and the exhaust flowing therethrough. For example, the exhaust system 10 can include an air/fuel sensor 42 in the exhaust conduit 30c in order to measure the air/fuel content of exhaust in the exhaust conduit 30c between the particulate filter 22 and the selective catalytic converter 24. The exhaust system 10 can further include a target constituent sensor 44 configured to measure the presence of any suitable exhaust constituent, such as $NO_x$. The target constituent sensor 44 can be located at any suitable position within the exhaust system 10 to measure the exhaust content of $NO_x$, for example, such as in the exhaust conduit 30d proximate to the exhaust outlet 30e, which can be at a tailpipe of the exhaust system 10.

Figure 2:
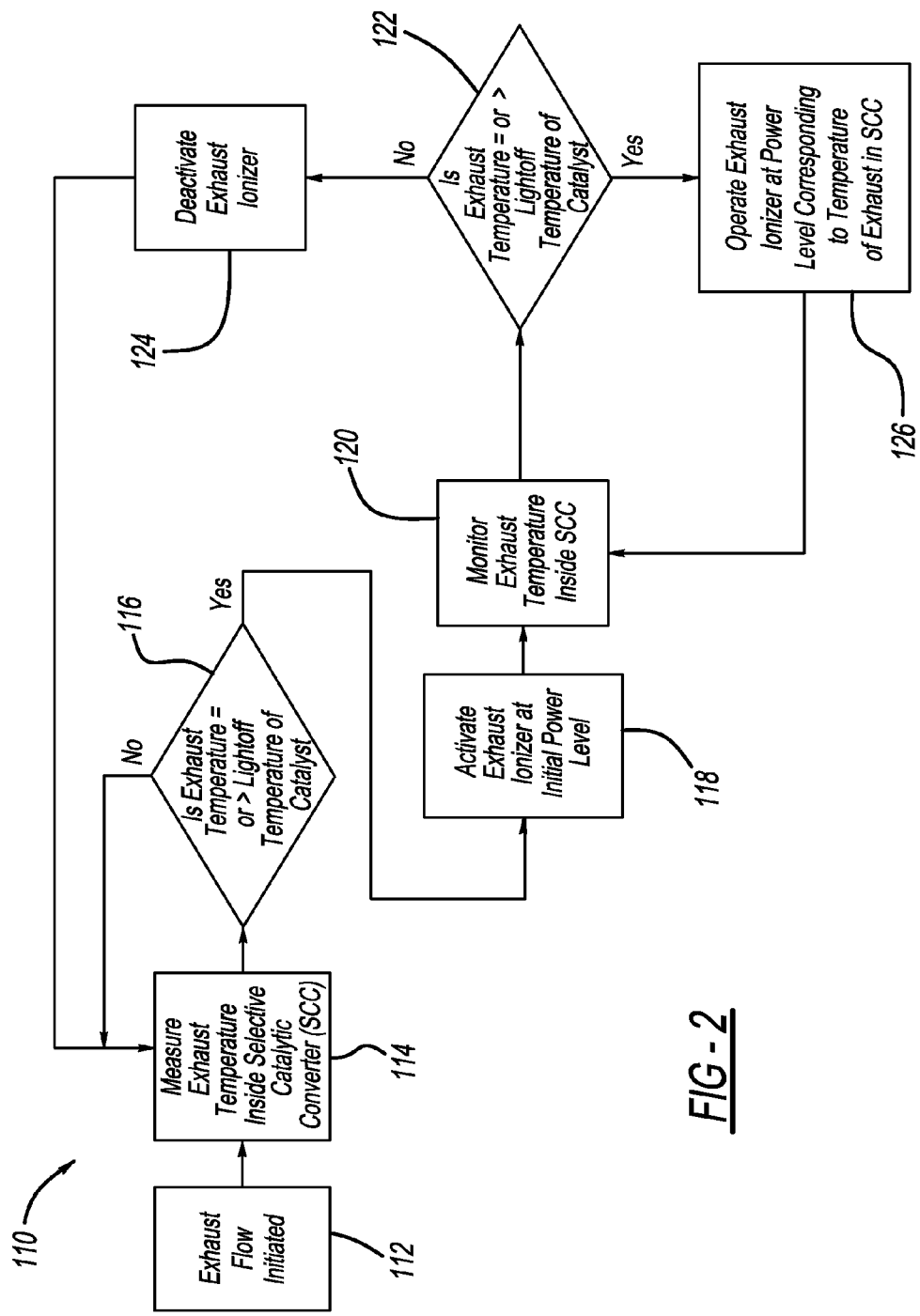
FIG. 2 is a flowchart of an exemplary method of operating an exhaust system of the present teachings.

With continued reference to FIG. 1 and additional reference to FIG. 2, a method for operating the exhaust system 10 is illustrated at reference numeral 110. With initial reference to block 112, exhaust gas flow is initiated at the exhaust source 12, causing exhaust to flow from the exhaust source 12 through the exhaust conduit 30a and to the ionizing chamber 14. The exhaust ionizer 16 will initially be in a deactivated state at engine start, and thus the exhaust will flow through the ionizing chamber 14 without being charged by the exhaust ionizer 16.

From the ionizing chamber 14, the exhaust flows through the exhaust conduit 30b and the particle collection device 18 therein. Because the exhaust has not been charged by the exhaust ionizer 16, the particle collection device 18 will likely not filter the exhaust. From the particle collection device 18, exhaust flows through the primary catalytic converter 20, which will convert carbon monoxide, unburned hydrocarbons, and oxides of nitrogen ($NO_x$) into carbon dioxide, water, and nitrogen. From the primary catalytic converter 20, the exhaust flows through the particulate filter 22, which will further filter unburned hydrocarbons from the exhaust.

From the particulate filter 22, the exhaust flows through exhaust conduit 30c to the selective catalytic converter 24, and then exits the exhaust system 10 at the exhaust outlet 30e of the exhaust conduit 30d. As the exhaust flows through the selective catalytic converter 24, the first and second temperature sensors 40a and 40b measure the temperature of the exhaust as the exhaust flows into and out of the selective catalytic converter 24. From the temperature measurements of the first and second temperature sensors 40a and 40b, a controller 50 of the exhaust system 10 determines the exhaust temperature (and indirectly the catalyst temperature) inside the selective catalytic converter 24 at block 114 of FIG. 2.

The controller 50 receives inputs from each of the sensors 40a-40e, 42, and 44. The controller 50 is connected to the exhaust ionizer 16 in order to operate the exhaust ionizer 16 based on inputs received from the temperature sensors 40a-40e, particularly the first and second temperature sensors 40a and 40b, which measure exhaust temperature within, and the catalyst of, the selective catalytic converter 24. The controller 50 is thus configured to optimize operation of the exhaust ionizer 16 based on temperature of exhaust within the selective catalytic converter 24 as described herein.

At block 116 of FIG. 2, if the temperature of the catalyst of the selective catalytic converter 24 is equal to or below the lightoff temperature of the catalyst as measured based on the temperature of the exhaust within the selective catalytic converter 24 (measured by the first and the second temperature sensors 40a and 40b), the controller 50 will not activate the exhaust ionizer 16 because the selective catalytic converter 24 will be ineffective to reduce $NO_x$. The method 110 will thus return to block 114 where the controller 50 will continue to monitor the temperature of the exhaust within the selective catalytic converter 24 and the temperature of the catalyst thereof. If at block 116 the controller 50 determines that the temperature of the exhaust within the selective catalytic converter 24 is at a level such that the catalyst of the selective catalytic converter 24 is above its lightoff temperature, the method 110 proceeds to block 118, at which the controller 50 will activate the exhaust ionizer 16 at an initial power level.

When activated, the exhaust ionizer 16 will charge exhaust as it passes through the ionizing chamber 14 so as to provide the exhaust with a positive or negative charge, based on the type and configuration of the exhaust ionizer 16. The charged exhaust is filtered as it passes through the particle collection device 18, because the particle collection device 18 is provided with a charge opposite to that applied by the exhaust ionizer 16. The particle collection device 18 will filter various particles from the exhaust, such as unburned hydrocarbons. The filtered exhaust proceeds to the primary catalytic converter 20 where carbon monoxide, oxides of nitrogen, and any additional unburned hydrocarbons are converted to carbon dioxide, water, and diatomic nitrogen ($N_2$). Any additional particulates present in the exhaust, such as any additional unburned hydrocarbons, are further filtered by the particulate filter 22. Because the selective catalytic converter 24 was activated at block 118, any additional $NO_x$ present in the exhaust, such as $NO_x$ generated by the activated exhaust ionizer 16, will be converted to diatonic nitrogen ($N_2$) and water ($H_2O$) as the exhaust passes through the selective catalytic converter 24.

At block 120, the controller 50 continues to monitor the exhaust of the selective catalytic converter 24 in order to optimize operation of the exhaust ionizer 16. At block 122, if the temperature of exhaust in the selective catalytic converter 24 is not equal to or greater than the lightoff temperature of the catalyst of the selective catalytic converter 24, which signals that the catalyst of the selective catalytic converter 24 will no longer be effective to reduce $NO_x$, the controller 50 proceeds to block 124 and deactivates the exhaust ionizer 16. From block 124, the controller 50 proceeds to block 114 and continues to monitor temperature of exhaust within the selective catalytic converter 24 in order to determine at block 116 whether the temperature of the catalyst of the selective catalytic converter 24 is above its lightoff temperature, and thus whether it is appropriate to reactivate the exhaust ionizer 16.

If at block 122 the controller 50 determines that the exhaust temperature is still greater than or equal to the lightoff temperature of the catalyst of the selective catalytic converter 24, the controller proceeds to block 126. At block 126, the controller 50 operates the exhaust ionizer 16 at a power level corresponding to the temperature of the exhaust in the selective catalytic converter 24 and the temperature of the catalyst thereof. For example, and with reference to FIG. 3, as the temperature of the exhaust within the selective catalytic converter 24 and the catalyst thereof increases, the selective catalytic converter 24 will be more effective to reduce the amount of a target constituent present in the exhaust, such as $NO_x$. Therefore, the power level of the exhaust ionizer 16, which generates the target constituent, such as $NO_x$, can be increased. As the power level of the exhaust ionizer 16 is increased, the exhaust ionizer 16 will be more effective to charge exhaust passing therethrough, thereby cleaning the exhaust of particulate matter, such as unburned hydrocarbons, because the unburned hydrocarbons will be filtered by, for example, the oppositely charged particle collection device 18. From block 126, the controller proceeds to block 120 where it continues to monitor exhaust temperature in the selective catalytic converter 24, and the temperature of the catalyst thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for treating exhaust from an engine comprising:
    activating an exhaust ionizer in receipt of the exhaust when temperature of a catalyst of a selective catalytic converter, which is in communication with the exhaust ionizer so as to receive exhaust from the exhaust ionizer, is equal to or above an effective temperature; and
    deactivating or maintaining the exhaust ionizer in a deactivated state when temperature of the catalyst is below the effective temperature.

2. The method of claim 1, further comprising determining temperature of the catalyst based on temperature of exhaust within the selective catalytic converter.

3. The method of claim 2, further comprising monitoring the temperature of exhaust within the selective catalytic converter with a temperature sensor, and a controller in receipt of signals from the temperature sensor.

4. The method of claim 1, wherein the selective catalytic converter is configured to reduce $NO_x$.

5. The method of claim 1, wherein activating the exhaust ionizer includes activating one of a corona discharge device or a plasma reactor.

6. The method of claim 1, wherein the effective temperature is a lightoff temperature above which the selective catalytic converter is effective to oxidize a target emissions constituent.

7. The method of claim 1, further comprising collecting particulate matter in the exhaust with a particle collection device that is charged opposite to a charge applied to the exhaust by the exhaust ionizer.

8. The method of claim 1, further comprising setting the exhaust ionizer at an activated power level proportional to temperature of the catalyst.

9. The method of claim 1, further comprising removing particulate matter from exhaust with a particulate filter arranged between the exhaust ionizer and the selective catalytic converter.

10. The method of claim 1, further comprising oxidizing carbon monoxide to carbon dioxide with a catalyst arranged between the exhaust ionizer and the selective catalytic converter.

11. The method of claim 1, further comprising removing particulate matter from exhaust with a diesel particulate filter.

12. A system for treating exhaust from an engine comprising:
   an exhaust ionizer configured to ionize exhaust;
   a selective catalytic converter configured to oxidize a target emissions constituent; and
   a controller configured to receive temperature data representing temperature of a catalyst of the selective catalytic converter, activate the exhaust ionizer when temperature of the catalyst is equal to or above an effective temperature, and deactivate or maintain the exhaust ionizer in a deactivated state when temperature of the catalyst is below the effective temperature.

13. The system of claim 12, wherein the exhaust ionizer includes a corona discharge device.

14. The system of claim 12, wherein the exhaust ionizer includes a plasma reactor.

15. The system of claim 12, wherein the selective catalytic converter is configured to reduce $NO_x$.

16. The system of claim 12, wherein the controller is configured to set the exhaust ionizer at an activated power level proportional to temperature of the catalyst and exhaust within the selective catalytic converter, the controller increases power to the exhaust ionizer as the temperature increases.

17. The system of claim 12, further comprising:
   a primary catalytic converter configured to at least oxidize carbon monoxide present in the exhaust; and
   a particulate matter filter configured to filter particulate matter from the exhaust;
   wherein the primary catalytic converter and the particulate matter filter are between the exhaust ionizer and the selective catalytic converter.

18. The system of claim 12, further comprising a collection device charged opposite to a charge applied by the exhaust ionizer, the collection device downstream of the exhaust ionizer with respect to exhaust flow.

19. A system for treating exhaust from an engine comprising:
   an exhaust ionizer configured to ionize exhaust;
   a selective catalytic converter configured to oxidize a target emissions constituent;
   a primary catalytic converter configured to at least oxidize carbon monoxide, the primary catalytic converter is between the exhaust ionizer and the selective catalytic converter;
   a particulate matter filter configured to filter particulate matter from the exhaust, the particulate matter filter is between the primary catalytic converter and the selective catalytic converter;
   a particle collection device between the exhaust ionizer and the primary catalytic converter that is charged opposite to a charge applied to the exhaust by the exhaust ionizer;
   at least one temperature sensor configured to measure temperature of a catalyst within the selective catalytic converter; and
   a controller in receipt of temperature measurements from the at least one temperature sensor, the controller configured to activate the exhaust ionizer when temperature of the catalyst is equal to or above an effective temperature, and deactivate or maintain the exhaust ionizer in a deactivated state when temperature of the catalyst is below the effective temperature.

20. The system of claim 19, wherein the selective catalytic converter is configured to reduce $NO_x$, and the exhaust ionizer is one of a corona discharge device or a plasma reactor.

* * * * *